United States Patent [19]

Chang

[11] Patent Number: 5,557,549
[45] Date of Patent: Sep. 17, 1996

[54] KNOWLEDGE BASED DIAGNOSTIC ADVISORY SYSTEM AND METHOD FOR AN AIR SEPARATION PLANT

[75] Inventor: Ching M. Chang, Williamsville, N.Y.

[73] Assignee: Praxair Technology, Inc., Danbury, Conn.

[21] Appl. No.: 411,917

[22] Filed: Mar. 28, 1995

Related U.S. Application Data

[63] Continuation of Ser. No. 952,819, Sep. 28, 1992.

[51] Int. Cl.$^6$ ................................................. G06F 17/00
[52] U.S. Cl. .................. 364/551.01; 364/188; 364/402; 395/12; 395/50; 395/54; 395/161; 395/914
[58] Field of Search ........................... 395/12, 50, 54, 395/157, 158, 160, 161, 911, 914, 915; 364/402, 188, 551.01

[56] References Cited

U.S. PATENT DOCUMENTS

| | | | |
|---|---|---|---|
| 4,591,983 | 5/1986 | Bennett et al. | 364/403 |
| 4,752,889 | 6/1988 | Rappaport et al. | 364/513 |
| 4,829,426 | 5/1989 | Burt | 364/300 |
| 4,839,822 | 6/1989 | Dormond et al. | 364/413.02 |
| 4,939,680 | 7/1990 | Yoshida | 364/513 |
| 4,964,063 | 10/1990 | Esch | 364/513 |
| 4,965,741 | 10/1990 | Winchell | 364/513 |
| 4,972,328 | 11/1990 | Wu et al. | 364/513 |
| 5,065,347 | 11/1991 | Pajak et al. | 395/159 |
| 5,072,412 | 12/1991 | Henderson, Jr. et al. | 395/159 |
| 5,099,436 | 3/1992 | McCown et al. | 364/550 |
| 5,237,654 | 8/1993 | Shackelford et al. | 395/160 |
| 5,241,671 | 8/1993 | Reed et al. | 395/600 |
| 5,262,761 | 11/1993 | Scandura et al. | 340/133 |
| 5,265,031 | 11/1993 | Malczewski | 364/497 |
| 5,283,864 | 2/1994 | Knowlton | 395/158 |
| 5,353,316 | 10/1994 | Scarola et al. | 376/259 |

*Primary Examiner*—Robert A. Weinhardt
*Assistant Examiner*—Joseph Thomas
*Attorney, Agent, or Firm*—Cornelius F. O'Brien

[57] ABSTRACT

This invention is a method and system for troubleshooting a breakdown or malfunction in an industrial plant facility identified by alarm or shutdown signals based upon forming a knowledge base of knowledge elements for providing advice and guidance to the technician. Each fault condition has a set of knowledge elements arranged in a sequence having an ordered hierarchy corresponding to different levels of information. The subordinate knowledge elements are linked to permit selection for display on a computer monitor in a specified manner and in a predetermined cascade arrangement relative to each higher level knowledge element to which it is linked.

10 Claims, 17 Drawing Sheets

―― CONSULT THE DIAGNOSIS ADVISOR ――
MAIN TROUBLE-SHOOTING MENU

Page 1 of 4

1. PLANT SHUTDOWN/AIR COMPRESSOR MONITORS 1.1  Lo Column Pressure
   1.2  Condenser Low Level
   1.3  Condenser Hi Level
   1.4  RHX Cycle Failure
   1.5  Air Comp. Hi Vibration
   1.6  Discharge Hi Temp (Air)
   1.7  Discharge Hi Pressure (Air)
   1.8  Aftercooler Outlet Hi Temp (Air)
   1.9  Cooling Water Lo Pressure
   1.10 Lube Oil Lo Pressure
   1.11 Lube Oil Hi Temp
   1.12 Moisture Sep Hi Water Level
   1.13 Seal Gas Lo Pressure
   1.14 MCC Failure

[Over]

Help <F1>   Index <F2>   Write Notes <F3>   Word Search <F5>   Pattern Search <F8>

Fig. 2A

```
┌─ CONSULT THE DIAGNOSIS ADVISOR ──────────────────────────┐
│       MAIN TROUBLE-SHOOTING MENU                         │
│                                          Page 2 of 4     │
│                                                          │
│  1.  PLANT SHUTDOWN/AIR COMPRESSOR MONITORS              │
│      (Continued)                                         │
│                                                          │
│      1.15  Extended RHX Cycle Time                       │
│      1.16  Extended RHX Pressure Switch Time             │
│      1.17  Lube Oil Low Temp                             │
│      1.18  Air Compressor Surge                          │
│      1.19  Prelube Pump Running (Auxiliary)              │
│                                                          │
│  2.  TURBINE CONTROLS                                    │
│                                                          │
│      2.1  Turbine Lo Speed                               │
│      2.2  Turbine Hi Speed                               │
│      2.3  Lo Oil Pressure (Turbine)                      │
│      2.4  Oil Hi Temp (Turbine)                          │
│      2.5  Lo Seal Gas Pressure (Turbine)                 │
│                                                 [Over]   │
└──────────────────────────────────────────────────────────┘
Help <F1>  Index <F2>  Write Notes <F3>  Word Search <F5>  Pattern Search <F8>
```

Fig. 2B

―― Consult the Diagnosis Advisor ――
――― Main Trouble-Shooting Menu ―――
Page 3 of 4

2.  TURBINE CONTROLS (continued)

2.6  Turbine Discharge Lo Temp
    2.7  Turbine Thaw Gas Hi Temp
    2.8  Turbine Blower Hi Temp

3.  N2 COMPRESSOR MONITORS 3.1  Suction Lo Pressure (N2 Compressor)
    3.2  Discharge Hi Pressure (N2 Compressor)
    3.3  Discharge Hi Temp (N2 Compressor)
    3.4  Aftercooler Outlet Hi Temp (N2 Compressor)
    3.5  Oil Hi Temperature (N2 Compressor)
    3.6  Vibration (N2 Compressor)
    3.7  Lo Oil Level (N2 Compressor)

[Over]

Help <F1>   Index <F2>   Write Notes <F3>   Word Search <F5>   Pattern Search <F8>

Fig. 2C

```
──── Consult the Diagnosis Advisor ────
  ──── Main Trouble-Shooting Menu ────
                                          Page 4 of 4

4.  PERIPHERAL INSTRUMENTATION PROCESS (PIP) MONITORS
      (If Equipped)

4.1  Low Purity Shutdown
      4.2  Shutdown
      4.3  Turbine Shutdown
      4.4  Pipeline Low Pressure Alarm
      4.5  Trim Heater High Temperature Alarm
      4.6  LN2 Storage Tank Low Pressure Alarm
      4.7  LN2 Storage Tank Low Level Alarm
      4.8  Simultaneous Driox/Vent Isolation (End)

For trouble-shooting equipment problems not explicitly called out
  by the shutdown or PIP monitor lights listed above, please proceed to
  consult: Other Equipment Operational Problems.
```

Help <F1>   Index <F2>   Write Notes <F3>   Word Search <F5>   Pattern Search <F8>

Fig. 2D

```
┌─────────────────────────────────────────────────────────────┐
│         ┌─── Consult the Diagnosis Advisor ───              │
│         │── Main Trouble-Shooting Menu ──                   │
│         │── RHX Cycle Failure ──                            │
│                                                       [End] │
│ To trouble-shoot "RHX Cycle Failure," FOLLOW the diagnostic │
│ strategies listed below:                                    │
│                                                             │
│     STEP #1   SPECIFIC STRATEGIES                           │
│     ------------------------------------------------------  │
│     1-4-1    Check RHX Valves (1-4-1) for Defects           │
│     1-4-2    Check Instrument Gas Supply Line (1-4-2) for Plugging, │
│              Freeze-Up or Inadequacy in Supply Pressure     │
│     1-4-3    Check REX Cycle Failure Pressure Control Switches (1-4-3) │
│              for Proper operation                           │
│     1-4-4    Check Timers (1-4-4) for Defects or Adjustments │
│     ------------------------------------------------------  │
│        These strategies are to be implemented based on the "process of elimination" │
│ principle:                                                  │
│                                                             │
│                    Show Process of Elimination              │
│                                                             │
└─────────────────────────────────────────────────────────────┘
 Help <F1>  Index <F2>  Write Notes <F3>  Word Search <F5>  Pattern Search  <F8>
```

Fig. 3

Consult the Diagnosis Advisor
Main Trouble-Shooting Menu
RHX cycle Failure
Check Timers (1-4-4)
Page 1 of 3

Timers affect the Operation of Reversing Heat Exchangers. see the Functions of RHX Timers for possible timers failures which could shut down the N-plant. CONSULT the fault tree diagram and TAKE the action steps shown below:

View Decision Tree for Timers

1.　　CHECK RHX Cycle Timer

View RHX Cycle Timer
　　　　View Example of a Faulty Timer 1.1　RUN compressor or SHORT the relay electrically to start RHX Cycle Timer. See Jumper to start RHX Cycle Timer for specific guidelines. OBSERVE if its needle moves and resets properly after 10 minutes.

(Over)

Fig. 4A

```
──── Consult the Diagnosis Advisor
 ──── Main Trouble-Shooting Menu
  ──── RHX Cycle Failure
   ──── Check Timers (1-4-4)
                              Page 2 of 3

1.2  If the timer is found to be defective, REPLACE it.  If an
Eagle Cycle-Flex timer is used, which may not work properly, REPLACE
it with a new timer of the same type.  This type of timers is known to
fail frequently.

2.   CHECK Cycle Failure Timer

View RHX Cycle Failure Timer

JUMP the relay electrically (i.e. SHORTING) to start RHX Cycle Failure Timer.
See Jumper to Start RHX Cycle Failure Timer for
Specific procedures.  OBSERVE if its needle moves and resets properly
after 5 minutes.  If the RHX Cycle Failure Timer is found to be
defective, REPLACE it.

View Relays (Over)
```

Fig. 4B

- Consult the Diagnosis Advisor
  - Main Trouble-Shooting Menu
    - RHX Cycle Failure
      - Check Timers (1-4-4)
        - Operation of Reversing Heat Exchangers
          Page 1 of 4

The reversing heat exchangers operate as follows:

1. Ambient air enters the warm end of the <u>Warm Leg</u>. It gives up heat to the counterflow cooling streams (product nitrogen and waste heat nitrogen) in neighboring passages, causing the entrained water vapor to condense. The condensed water remains frozen on the warm leg heat exchanger surface.

Air at reduced temperature continues its flow into the <u>Cold Leg</u>. Its temperature is continuously being reduced by heat exchange with the cooling streams, causing the entrained carbon dioxide to condense. The condensed carbon dioxide remain frozen on the cold leg (Over)

[over]

minutes.

Fig. 5A

- Consult the Diagnosis Advisor
  - Main Trouble-Shooting Menu
    - RHX cycle Failure
      - check Timers (1-4-4)
        - Functions of RHX Timers Page 1 of 2

The following timers are used in an N-plant to control and operate the RHX cycle:

1. RHX Cycle Timer

Mounted on the front of Main Instrumentation Panel, this timer has a 6" dial, with two indicators to set cycle time (Range: 0 to-60 minutes, Cycle time usually set: 10 minutes).

2. RHX cycle Failure Timer

[over]

guidelines. OBSERVE if its needle moves and resets properly after 10 minutes.

Fig. 5B

```
┌─ Consult the Diagnosis Advisor ─────────────────┐
│ ┌─ Main Trouble-Shooting Menu ─────────────────┐ │
│ │ ┌─ RHX Cycle Failure Check Timers (1-4-4) ──┐ │ │
│ │ │ ┌─ Index Search ─────────────────────────┐ │ │ │
│ │ │ │                                        │ │ │ │
Timers     │ ABSORPTION                             │
Functions c│ ADSORPTION                             │
down the N-│ AFTERCOOLER OUTLET HI TEMP (Air)       │
steps shown│ AFTERCOOLER OUTLET HI TEMP (N2 COMPRESSOR)│
           │ AIR COMPR. HI VIBRATION                │
   View    │ AIR COMPRESSOR SURGE                   │
           │ AIR COMPRESSORS                        │
  1.  CHF  │ AIR FLOW CONTROL                       │
           │ AIR FLOW STRIP CHART                   │
           │ ANALOG INPUT MODULES                   │
           │ ANALOG OUTPUT MODULES                  │
           │ APPROACH                               │
       1.1 │ ATMOSPHERE                             │
           │ AUXILIARY OIL PUMP                     │
RHX Cycle  │ BASELOAD NITROGEN COMPRESSORS          │
guidelines │ BASIC TROUBLE-SHOOTING PROCEDURE  for more
minutes
```

Fig. 10

Consult the Diagnosis Advisor
Main Trouble-Shooting Menu
RHX Cycle Failure
Check Timers (1-4-4)

Page 1 of 3

Timers affect the Operation of Reversing Heat Exchangers. See the Functions of RHX Timers for possible timers failures which could shut down the N-Plant. CONSULT the fault tree diagram and TAKE the action steps
Perform Keyword Search 1. CHECK RHX Cycle Timer View RHX Cycle Timer
View Example of a Faulty Timer 1.1 RUN compressor or SHORT the relay electrically to start RHX Cycle Timer. See Jumper to Start RHX Cycler Timer for specific guidelines. OBSERVE if its needle moves and resets properly after 10 minutes.
(Over)

Fig. 11

KNOWLEDGE BASED DIAGNOSTIC ADVISORY SYSTEM AND METHOD FOR AN AIR SEPARATION PLANT

This application is a Continuation of prior U.S. application Ser. No. 07/952,819 Filing Date Sep. 28, 1992.

FIELD OF INVENTION

This invention relates to a knowledge based diagnostic advisory system and method for troubleshooting a breakdown or malfunction in an industrial production plant and more particularly to a method of troubleshooting a breakdown or malfunction in an industrial plant facility which will readily pinpoint the source of an abnormal condition of operation causing the breakdown or malfunction in order to expedite repair and restore the plant to normal operation.

BACKGROUND OF THE INVENTION

Industrial plant facilities particularly chemical plants are large and complex systems which include chemical, mechanical and electrical equipment subsystems. An abnormal condition of operation or an impairment in any piece of equipment can cause a decrease in plant production or in the efficiency of plant operation or cause complete plant breakdown. Accordingly, it is essential to identify the fault as quickly as possible and to repair it. It is customary in the design of a chemical plant to include an instrumentation panel which may be located at the plant site to identify applicable alarm or shutdown conditions. The instrumentation panel contains a multiplicity of signal lights which are integrated into the chemical, mechanical and/or electrical equipment subsystems through control circuitry to respond to upsets corresponding to predetermined changes in process variables for identifying the existence of an abnormal condition of plant operation. A signal light functionally identifies an existing alarm or shutdown condition corresponding to each major equipment subsystem in the plant. The generation of an alarm or shutdown signal means only that one or more process variables which may be affected by a fault in the major equipment subsystem corresponding to the alarm or shutdown light has exceeded or dropped below a predetermined set point range. It does not specifically identify the fault or give any clue as to the specific equipment component(s) that may have failed, the extent of the failure or how to proceed to evaluate the failure and take remedial action. This is relegated to the technician who has the responsibility for diagnosing alarm or shutdown conditions. In addition to the display of an alarm or shutdown condition electronic means may also be used to store the alarm or shutdown signal in computer memory and provide computer sound signals to alert operations personnel and/or to send such signals via modem to service personnel at a remote site.

To assist the technician to troubleshoot an alarm or shutdown condition many industrial companies commonly publish operation manuals which contain troubleshooting guides. These guides include lists of potential faults, usually in tabular form, as well as brief descriptions of anticipated symptoms, possible causes and recommended remedial solutions. Cross references are made to other sections of the same document, to sections of other publications such as vendor literature and to specific drawings located in a drawing package for additional information. Unfortunately once an alarm or shutdown condition occurs time is of the essence to determine the fault causing the alarm or plant shutdown and to correct it. The technician simply does not have the leisure of spare time to pursue an exhaustive search through various cross reference leads as set forth in the operations manual to troubleshoot an existing plant alarm condition. Moreover the technician is under such tension to resolve the alarm or shutdown condition that looking at reference material is not always considered productive. In any event the references identified in a troubleshooting guide refer to various information sources and are not coordinated for the technician to use in connection with the resolution of a specific alarm or shutdown condition the cause of which is precisely what the technician needs to diagnose.

In recent years diagnostic expert systems have become available in which use is made of "if-then" rules to represent the heuristics of selected human experts on any given subject for use as a diagnostic tool. The if-then rules may be encoded from knowledge acquired from selected human experts in knowledge acquisition sessions conducted specifically for preserving the valuable heuristics gained and perfected over the years for diagnosing plant equipment and process faults. Knowledge may also be gleaned from supporting materials such as operations manual, vendor literature, training course notes, flow charts, fault tree logic diagrams and other such technical documents to create the if-then rules, which are complied to create a rule-based expert system. Typically, such an expert system utilizes multiple choice questions asked of the operator to identify observable symptoms of known faults. If electronic means are available to automatically acquire and input certain plant process data into the expert system then the operator or service technician is expected to answer mutiple choice questions to supplement the information automatically gathered. The expert system follows a predetermined inference sequence (e.g., backward chaining and/or forward chaining) in processing the rules and upon identification of a problem, in response to the information contained in the acquired process data and/or to the information contained in the operators answers to the multiple choice questions, is able to formulate a probable answer for the real cause of the process or equipment fault under consideration followed by advice for remedial action. The quality of the advice produced by a rule based diagnostic expert system depends heavily upon the quality of knowledge which can be attained by translating the diagnostic expertise of a human expert into a set of discrete rules to enable the expert system to identify the problem using the information contained in the gathered plant process data and/or that supplied by the service technician. Accordingly the operator is not an active decision maker in evaluating the available information to diagnose the problem and is not offered an opportunity to engage in active learning in the review of the available symptoms or in validating suspected faults or in selecting the appropriate remedial action. Moreover, if the queries of the expert system are not adequately or properly satisfied the diagnostic expert system will produce non-conclusive and/or useless advice or if an excessive number of questions are asked of the service technician, many of which do not have easy answers, the service technician is likely to be frustrated. Expert systems tend to be resented over time because decision making is excluded from the operator and the operator gains little if any experience from its use.

SUMMARY OF THE INVENTION

The present invention is a diagnostic method for troubleshooting an abnormal condition of production within an industrial plant facility identified by one or more alarms or shutdown signals corresponding to different fault conditions affecting the normal production of product comprising the steps of:

forming a knowledge base composed of a hierarchy of knowledge elements for providing advice and guidance to an operator to enable the operator to determine the cause of the fault condition and its most efficacious solution, with each identified fault condition having a set of knowledge elements, for providing textual, graphical and/or video material, arranged in a sequence having an ordered priority corresponding to different levels of information with the highest priority knowledge element for the identified fault condition providing a preset number of diagnostic strategies with each strategy incorporating one or more subordinate knowledge elements in ranked order to the higher knowledge elements and to one another in accordance with the priority given to each level of information;

storing said knowledge base in a computer;

selecting for display the highest priority knowledge element corresponding to an existing fault condition;

displaying the selected highest priority knowledge element on a monitor connected to said computer;

selecting a subordinate knowledge element identified within the selected highest priority knowledge element with said subordinate knowledge element containing a list of action steps to be taken by the user to relate the fault condition to a specific device, component or process known to cause such default and outlining one or more appropriate remedial action steps to correct such device, component or process;

displaying the selected subordinate knowledge element on said monitor in a cascade fashion relative to its higher ranking knowledge element;

highlighting in succession each action step in said subordinate knowledge element to be taken by the user;

linking each highlighted action step in each subordinate knowledge element to other knowledge elements of lower ranking to provide the user with access to additional information and advice relating to each action step; and displaying as needed each linked lower ranking knowledge element in succession and in a cascade fashion partially superimposed over each higher ranking knowledge element to provide further information to the user to facilitate remedial action to correct the fault condition with the operator knowing at all times the position of the knowledge element displayed relative to all linked higher ranking knowledge elements.

The present invention also relates to a diagnostic advisory system for troubleshooting an abnormal condition in the production of a product within an industrial plant facility identified by one or more alarms or shutdown signals triggered by different fault condition(s) affecting the normal production of said product with said diagnostic advisory system comprising:

a programmed computer including memory means for storing a knowledge base composed of a hierarchy of knowledge elements containing textual, graphical and/or video material for providing advice and guidance to an operator to enable the operator to determine the cause of the fault condition and its most efficacious solution, with the knowledge elements arranged in a sequence having an ordered priority corresponding to different levels of information with the highest priority knowledge element for the identified fault condition providing a preset number of diagnostic strategies with each strategy incorporating one or more subordinate knowledge elements in ranked order to the higher knowledge elements and to one another in accordance with the priority given to each level of information;

means for interactively linking subordinate knowledge element(s) to their higher priority knowledge element(s);

display means for selectively displaying each of said knowledge elements with each subordinate knowledge element displayed in a cascade formation relative to all higher ranking knowledge elements to which it is linked;

means for successively displaying as needed each lower ranking knowledge element within the linkage chain of knowledge elements to facilitate remedial action to correct a fault condition; and means for returning to the higher knowledge element from which the displayed lower knowledge element depends.

BRIEF DESCRIPTION OF THE DRAWINGS

Other advantages of the present invention will become apparent from the following detailed description of the invention when read in conjunction with the following drawings of which:

FIGS. 2(a)–2(d) are screen displays illustrating knowledge elements corresponding to typical alarm or shutdown conditions for diagnosing an abnormal operating condition in a conventional commercially operated air separation plant for generating nitrogen;

FIG. 3 is a screen display of the knowledge element "RHX Cycle Failure" selected from the knowledge elements listed in the display of FIG. 2(a);

FIGS. 4(a), 4(b) and 4(c) are screen display illustrations corresponding to the three pages of the subordinate knowledge element designated "Check Timers";

FIGS. 5(a) and 5(b) are screen displays of the first page of each of the subordinate knowledge elements designated "Operation Of Reversing Heat Exchanger" and "Functions of RHX Timers" respectively;

FIG. 10 is a screen illustration of an index search in accordance with the present invention; and FIG. 11 is a screen display illustrating a Keyword search in accordance with the present invention.

DETAILED DESCRIPTION OF THE INVENTION

Figure 1:
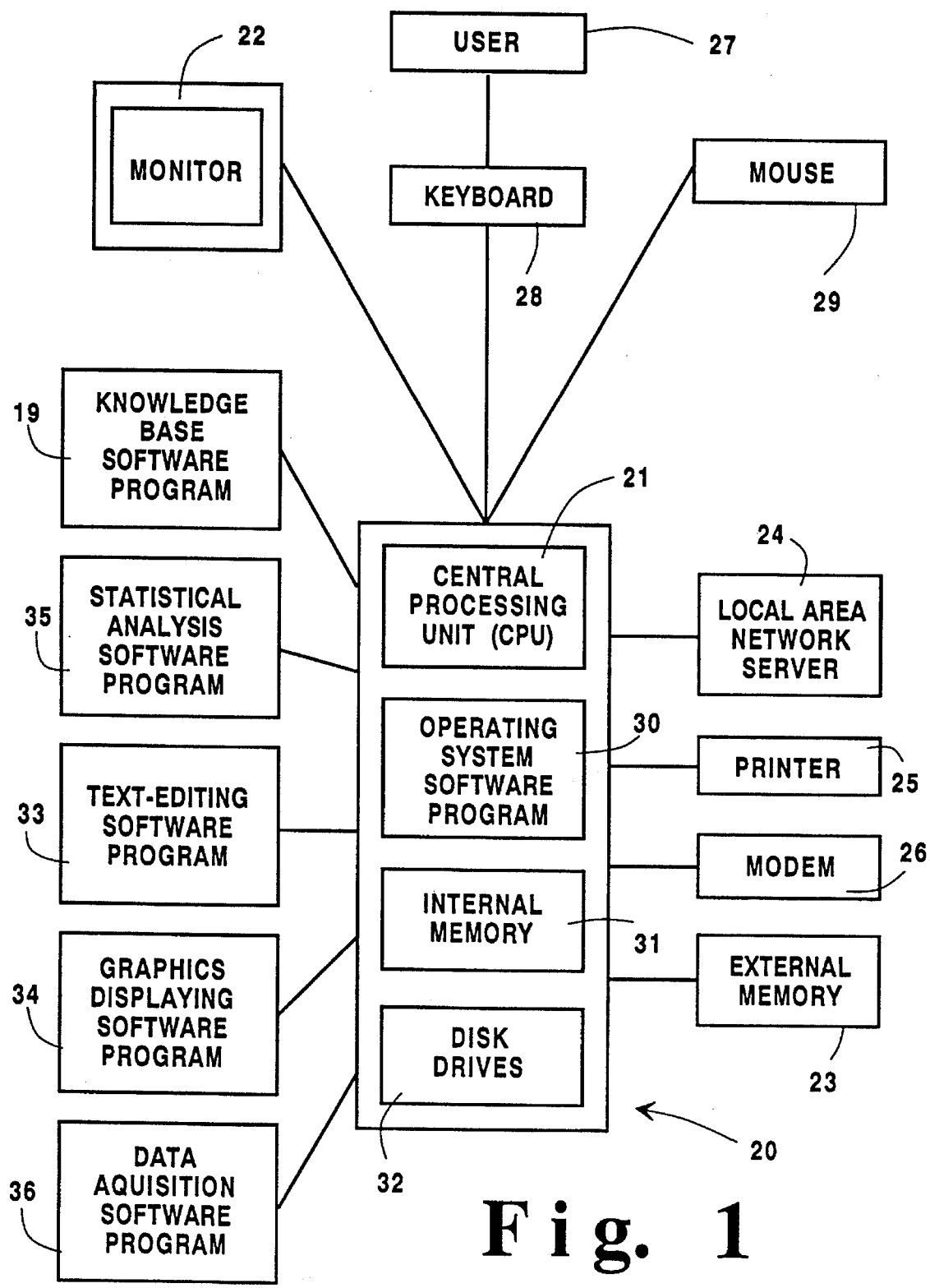
FIG. 1 is a system block diagram of the diagnostic advisory system of the present invention.

The operation of a large chemical production facility may be functionally categorized in terms of process and equipment required in the plant to produce product. To identify an abnormal condition in the production of any product or a shutdown of the plant it is customary to use signal lights or some other indicia of an alarm or shutdown condition to signify a breakdown or malfunction in a mechanical, chemical or electrical subsystem based upon an upset in one or more of the critical process variables in the production of a specific product. An alarm or shutdown signal identifies an emergency condition which requires the immediate attention of technical personnel responsible for troubleshooting malfunctions in the plant operation. The alarm or shutdown signal is generally represented as an indicator light on an instrumentation panel or a flashing signal light on a computer monitor and/or an audible sound and may be transmitted via modem to a remote site.

The diagnostic advisory system of the present invention is implemented through a knowledge base as hereafter discussed in detail premised upon the existence of alarm or shutdown signal(s) to initiate review of an abnormal operating condition in the plant. For purposes of simplicitiy of explanation the present invention will be described in connection with trobleshooting an air separation chemical plant to form purified nitrogen. The foregoing description of the advisory system is readily applicable to an air separation plant in which air is decomposed into purified constituents including nitrogen, oxygen, argon and other rare gases for distribution as a gas and/or liquid. The methodology underlying the diagnostic advisory system and method of the present invention is also readily applicable to any other manufacturing plant independent of the product manufactured at the plant where alarm or shutdown signals are used to identify a malfunction or shutdown condition.

Air separation plants are typically monitored by suitable instruments and control devices. Many process varibles such as e.g. temperature, pressure, flow rates, product concentration, cooling water ph values, vibration level of rotors, rotating speed of turbine, etc. are measured and recorded continuously. Specific set point values for alarm and threshold conditions are pre-defined for a number of crital process variables. An abnormal plant condition is triggered if one or more of these process varibles extend outside of its set point limit range or if one or more of the equipment subsystems fail to operate properly. This may be manifested by, for example, a malfunction in a reversing heat exchanger, excessive vibrations of an air compressor, over-speeding of a cryogenic turbine, etc. When an abnormal plant condition occurs, the plant monitoring system recognizes its existence by producing an alarm or shutdown signal. This signal is usually made visible by the illumination of a specific "Alarm" or "Shutdown" light on the main instrumentation panel of the plant. Separate alarm or shutdown lights are provided for each major equipment subsystem having a number of functionally related process variables such as e.g. air compressor, RHX(reversing heat exchanger) cycle, etc. The plant operator thus knows immediately which major equipment subsystem is operating out of its normal range of operation or has failed. The alarm or shutdown signal does not identify the cause of the problem or specify what actions are to be taken to remedy the fault condition. This function is left to the service technician who must immediately trobleshoot the alarm or shutdown condition and take the appropriate steps to remedy it.

The present invention is implemented on a personal computer 20 as shown in the system block diagram of FIG. 1. The computer 20 includes a central processing unit (CPU) 21, a conventional operating system software program 30, an internal memory 31 and one or more disk drives 32. The CPU is interfaced with a display monitor 22 and an external memory 23 and may be connected to a local area network server 24. Additional hardware such as a printer 25 and a modem 26 may also be connected to the computer 20. The computer 20 is also loaded with a knowledge base software program 19, which contains a set of knowledge elements as well as software codes implementing useful functionalities such as linkage operations as will be described in greater detail hereafter, screen management, search conduction, access to external programs, etc. All such functionalities as described hereafter in the specification are readily programmed by software programmers skilled in the art for implementation by the computer 20. External software programs such as for example text editing software program 33, graphics display software program 34, statistical analysis program 35, data acquisition program 36, and others may also be stored in the computer 20 for use in conjunction with the diagnostic advisory system of the present invention. A user 27 interfaces with the computer 20 through the keyboard 28 and mouse 29 and may print out any selected display on the printer 25.

To activate the diagnostic advisory system of the present invention, the technician turns on the computer 20, types at the C: prompt the name of the subdirectory in which the knowledge base software program 19 resides and depresses the <Enter> key. The technician then types the name of the batch file to activate the knowledge base software program 19 and depresses the <Enter> key one more time. Displayed initially on the monitor 22 will be the screen showing the knowledge base software program logo and some welcoming messages. Then a screen is displayed on the monitor 22 which identifies a menu designated the "Main Troubleshooting Menu". Entering the main troubleshooting menu will provide a display on the monitor 22 as is shown in FIGS. 2(a–d) representing four pages of display which collectively identifies all of the alarm and shutdown conditions for the plant. The category of faults for a typical air separation plant is shown subdivided into four categories of major equipment with each major category further broken down into process and equipment subcategories. An alarm or shutdown signal light corresponds to each subcategory in the troubleshooting menu i.e. the menu should contain a subcategory for each alarm or shutdown condition.

The knowledge base 19 is composed of a hierarchy of knowledge elements for providing advice and guidance to a service technician to enable the technician to determine the cause of the abnormal condition of operation as a result of the alarm signal and to remedy it. Each subcategory in the troubleshooting menu constitutes a knowledge element in accordance with the present invention. The knowledge elements contain information such as text material and graphics as well as knowledge represented in other suitable media including sound track, video images and animation files. The arrangement of the knowledge elements and the methodology of linking them for retrieval by the user is critical to the knowledge base of the present invention. Each knowledge element is given a priority based upon the information content or level of information contained in the knowledge element. The knowledge elements at the highest level contain a listing of alternate diagnostic strategies to determine the cause of the fault condition and to remedy it. Each diagnostic strategy contains text material and may include one or more lower level knowledge elements. For example, assume in FIG. 2(a) that the RHX cycle failure alarm condition identified as idem 1.4 has been activated which designates a failure in the reversing heat exchanger or in the condition of operation of the reversing heat exchanger or an existing condition either upstream and/or downstream of the reversing heat exchanger which is causing the reversing heat exchanger to fail.

The reversing heat exchanger operates to remove gaseous impurities such as carbon dioxide and moisture from an inlet air stream by condensing these impurities onto the heat exchanger surfaces while passing through the exchanger in one flow direction made possible by opening and closing a set of RHX valves, and regenerating these heat exchanger surfaces by vaporizing the condensed impurities through heating with oxygen enriched waste nitrogen which is made to flow in the opposite (reversed) flow direction through the same heat exchanger passages after the RHX valves are switched over. To diagnose the reversing heat exchanger cycle failure mode the operator moves the cursor to the corresponding idem 1.4 in FIG. 2(*a*) and depresses the <Enter> key on the keyboard. This will display the RHX Cycle Failure knowledge element as shown in FIG. 3. Each diagnostic strategy listed in the display of FIG. 3 contains another knowledge element which is subordinate in ranking to the RHX Cycle Failure knowledge element. The subordinate knowledge elements identified in the diagnostic strategies correspond to all of the key components and subsystems within the higher knowledge element to which each is subordinate. Thus the operator by just looking at the display in FIG. 3 can decide which key component or subsystem should be checked out.

Figure 4C:
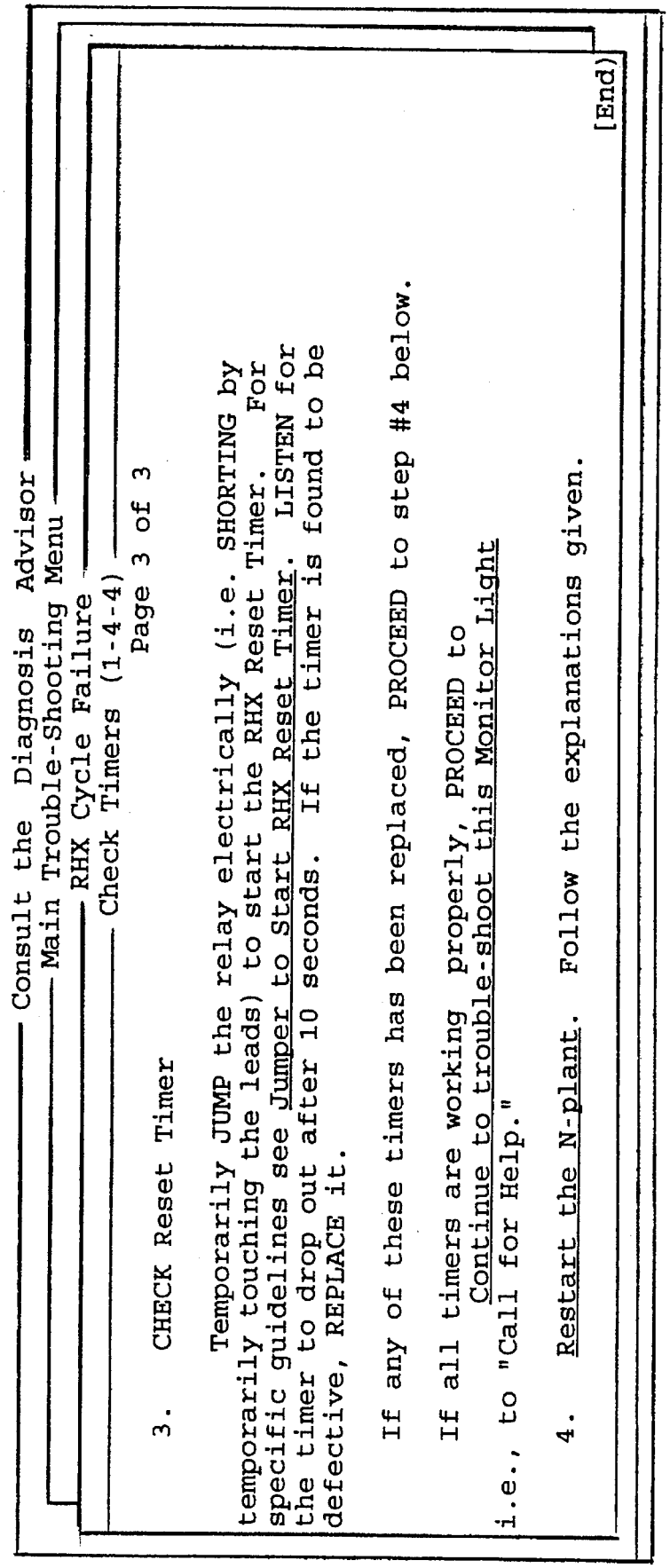

The listing of the diagnostic strategies in FIG. 3 have been classified and prioritized by the frequency of failure of the key components or subsystems from prior experience and as such represent a suggested sequence for troubleshooting an alarm or shutdown condition corresponding to the reversing heat exchanger cycle failure mode. Service technicians are advised to follow the suggested sequence, which represents the composite expertise in handling a given alarm or shutdown plant condition. However, notwithstanding the suggested sequence in the display of the RHX Cycle Failure knowledge element, the technician can make an election to evaluate any diagnostic strategy listed in the RHX Cycle Failue knowledge element in any order without regard to the priority indicated in FIG. 3. In the present example assume the operator wishes to immediately evaluate the specific diagnostic strategy identified in idem 1-4-4 of FIG. 3 entitled "Check Timers (1-4-4)". As indicated earlier each diagnostic strategy contains a subordinate knowledge element which for this example is the "Check Timers" knowledge element. The technician can open or display this knowledge element by moving the cursor to the knowledge element and depressing the <Enter> key. This displays the first page of the subordinate knowledge element "Check Timers (1-4-4)" as is shown in FIG. 4(*a*). The additional pages shown in FIGS. 4(*b*) and 4(*c*) may be displayed by depressing the <PgDn> key in succession once for each additional page. To scroll back from the pages shown in FIG. 4(*c*) and 4(*b*) to that shown in FIG. 4(*a*) the technician depresses the <PgUp> key in succession once for each page.

Each of the subordinate knowledge elements are linked to one another and to the highest knowledge element corresponding to a particular alarm or shutdown condition in a sequence based upon their ranking with each knowledge element displayed in a cascade fashion relative to all higher order linked knowledge elements. This visually identifies the linkage to each higher knowledge element so that the technician will always know precisely where in the chain of linked knowledge elements the display is located. The technician can move backwards to retrace the steps to the higher knowledge elements in the linkage by depressing the <Esc> key on the keyboard. This permits the technician to immediately start a different diagnostic strategy or simply to initiate a different action step within a specific knowledge element without concern for following any specific or recommended path of diagnosis.

The first page of the display of the subordinate knowledge element "Check Timers (1-4-1)" as shown in FIG. 4(*a*) begins with a brief headnote statement identifying the function of the timers for the reverse heat exchanger and an overall strategy of action steps for the technician to follow. The explanation in the brief headnote identifies two additional subordinate knowledge elements entitled "Operation Of Reversing Heat Exchangers" and "Function of RHX Timers respectively". For the purpose of clarity all of the linked subordinate knowledge elements are highlighted by being underlined. Alternatively and preferably, when a color monitor is available the linked subordinate knowledge elements should be highlighted using reversed video color or a combination of reversed video color and underlining. Accordingly, if the technician needs an elaborate explanation of what a reversing heat exchanger is and how the reversing heat exchanger operates and/or how the RHX Timers operate either knowledge element or both in succession may be opened for display by moving the cursor onto the highlighted title of the desired knowledge element and depressing the <Enter> key. An example of each display is shown in FIGS. 5(*a*) and 5(*b*) respectively.

Figure 6:
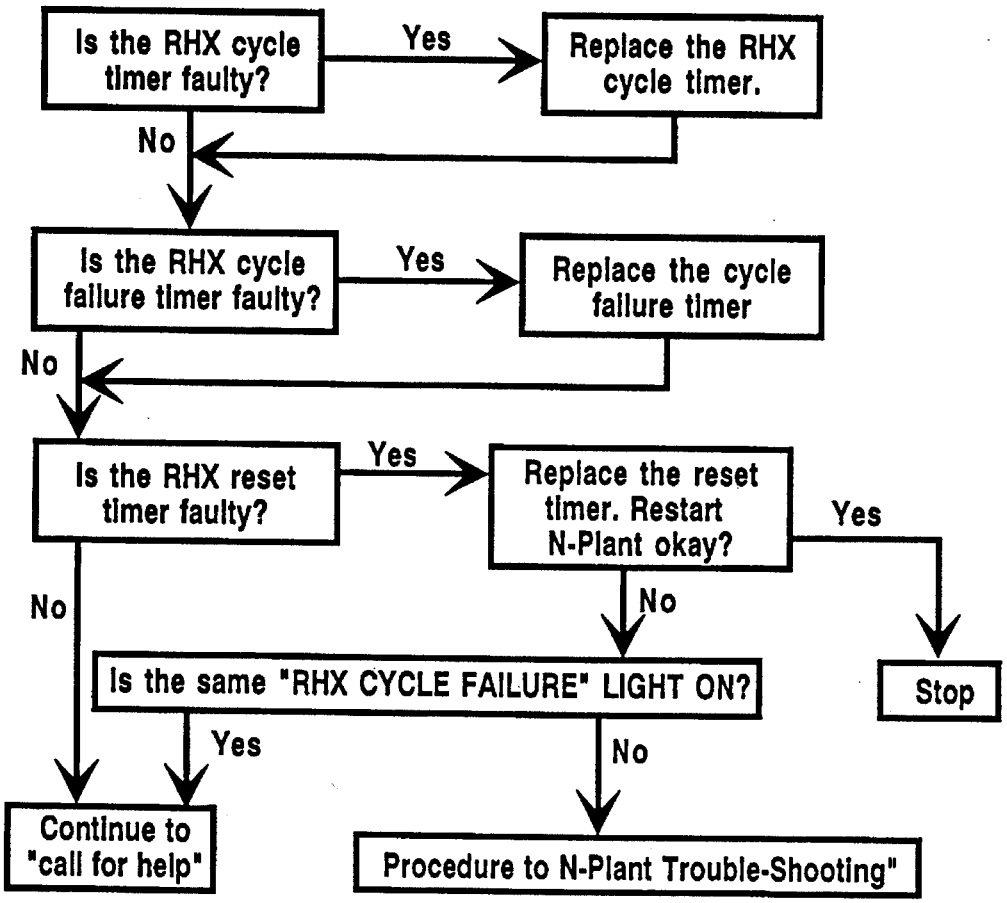
FIG. 6 is a screen display of the logic decision tree diagram for the timers identified in FIG. 4(a)
Figure 7:
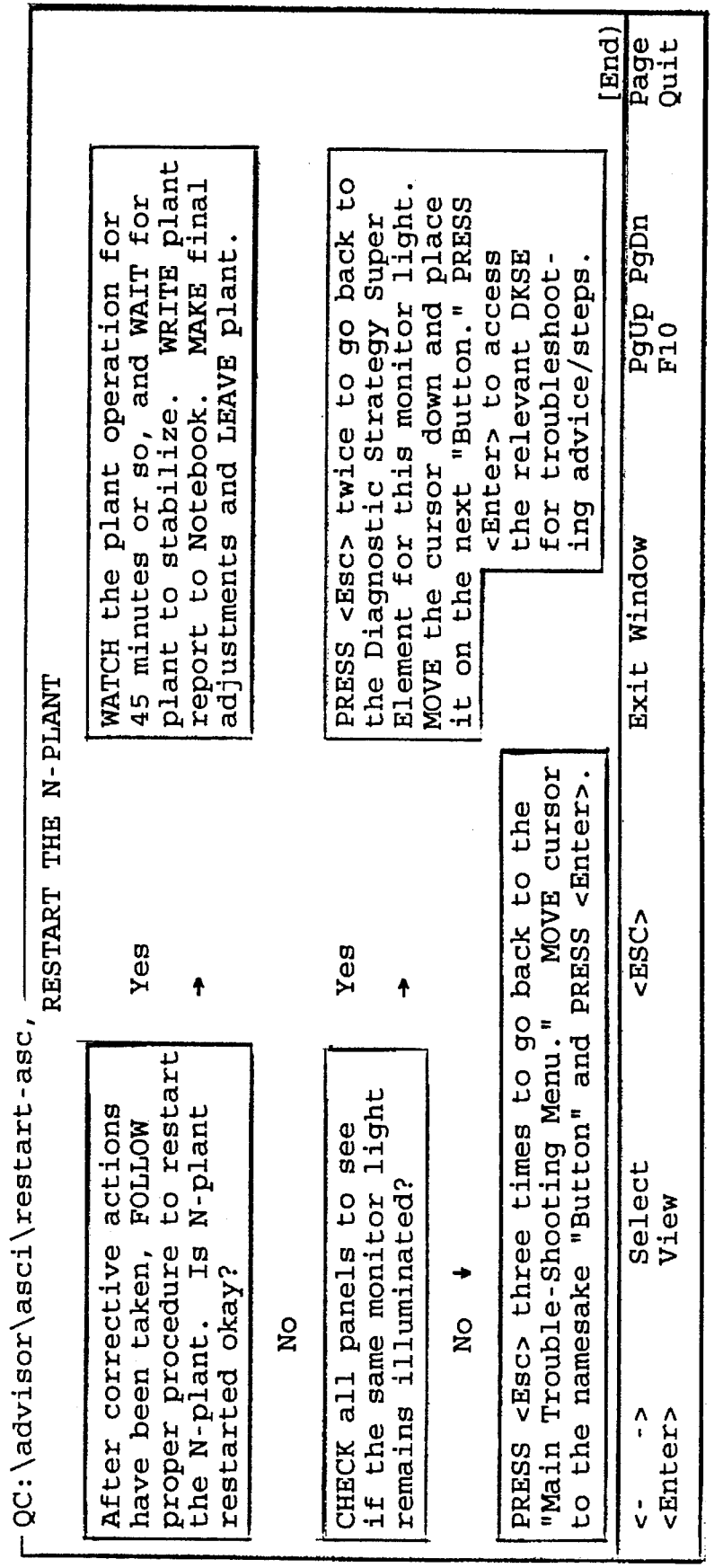
FIG. 7 is a screen display of a logic decision tree diagram for restarting the plant.

Before following any of the action steps identified in a subordinate knowledge element such as the illustrated knowledge element "Check Timers" shown in FIGS. 4(*a*)–(*c*) the technician may elect to first view the logical decision tree diagram which offers a global view of how to troubleshoot the RHX timers as shown in FIG. 6. This knowledge element is identified below the headnote in FIG. 4(*a*). Alternatively, or after studying the logical decision tree, the technician may proceed to follow any of the action steps listed in paragraphs 1 to 3 of the knowledge element "Check Timers". The technician upon replacing the defective timer(s) identified in the action steps may proceed to restart the plant or continue to troubleshoot the monitor light for RHX Cycle Failure if the alarm or shutdown condition is still present. A logic decision tree diagram for restarting the plant is shown in FIG. 7. The instruction to restart the plant is also found in the last page of the knowledge element Check Timers. If the monitor light remains illuminated the technician is instructed to go back to the selected highest order knowledge element corresponding to the alarm or shutdown condition, which for this example was the RHX Cycle Failure, and to select another diagnostic strategy such as e.g. "Check RHX Cycle Failure Pressure Control Switches (1-4-3) for Proper Operation". Upon exhausting all diagnostic stratagies or when the technician considers it appropriate, additional assistance may be sought through a "Call for Help" feature.

Figure 8:
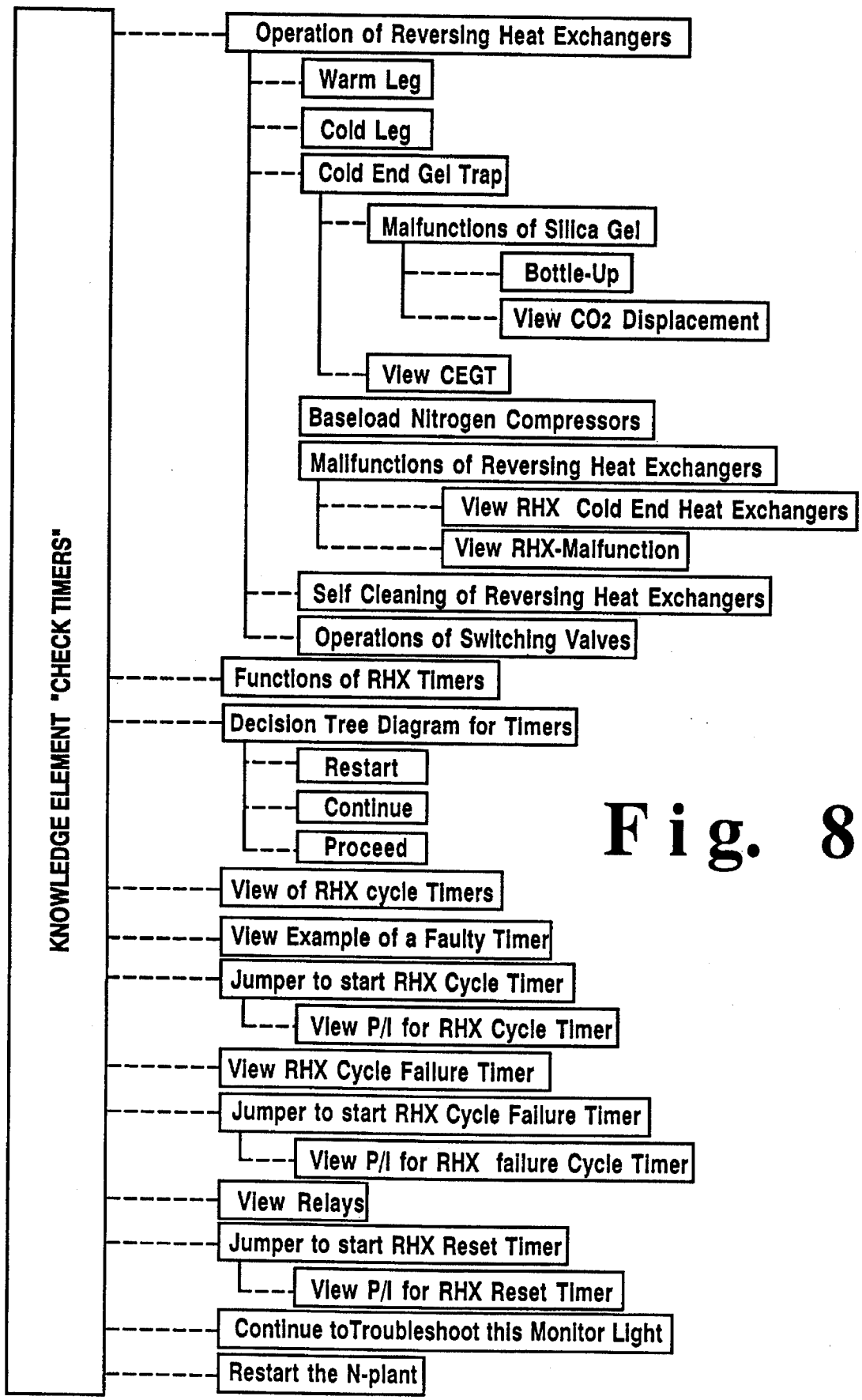
FIG. 8 is a flow diagram for all of the linking elements subordinate to the knowledge element designated "Check Timers"
Figure 9:
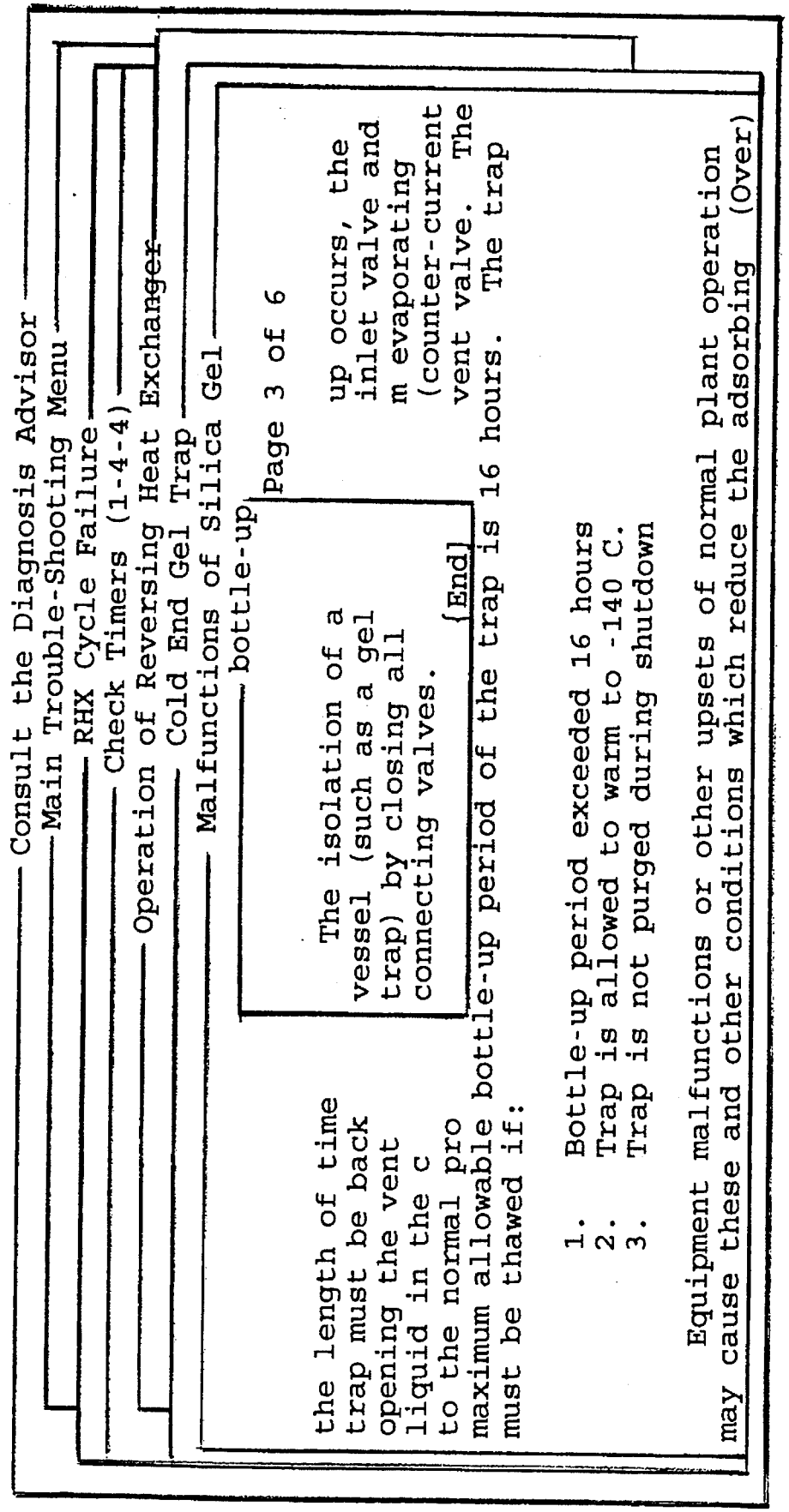
FIG. 9 is a screen display of the lower level knowledge element designated "Bottle-Up" in linked cascade formation to all its higher knowledge elements.

A flow diagram for all of the linking knowledge elements subordinate to the knowledge element entitled "Check Timers" for the Reversing Heat Exchanger Cycle Failure is shown in FIG. 8. The knowledge elements are all linked to the Check Timers knowledge element and are listed in accordance with their linkage to one another. If the technician selected the Check Timers knowledge element under the diagnostic step 1-4-4 of FIG. 4(*a*) and proceeded to open up the knowledge element "Operation Of Reversing Heat exchangers" as identified in the headnote of FIG. 5(*a*) four pages of screen text would be available for display one of which includes the lower level knowledge element entitled "bottle up". The technician could then proceed to open up this knowledge element for display as is shown in FIG. 9. When the technician proceeds as above described the knowledge element "bottle-up" is displayed in cascade formation partially superimposed over all of the higher knowledge elements to which it is linked in correspondence with the flow diagram of FIG. 8.

Alternatively, the diagnostic advisory system of the present invention permits the technician to jump out of the current set of linked knowledge elements to accelerate the review of any specific knowledge element or to make a keyword search or to access an external software program without losing the last display position in the knowledge base. This is accomplished using dedicated special function keys which permit the technician more freedom in exploring knowledge elements without following any specified priority or hierachy existing between the knowledge elements in the knowledge base. It also permits the technician to jump out of the knowledge base altogether to conduct a separate operation at any given moment during the diagnostic investigation.

The knowledge base software program of this invention includes the useful functionality of allowing the technician to keep the knowledge base on hold, jump out of the knowledge base, perform other operations, and return back to the same spot within the knowledge base afterwards.

Assume that the special function key F9 is designated for activating this functionality and that the separate operation of interest is to use a text-editing software program "B.exe" which resides in the subdirectory C:\advisor to write comments to an electronic file named "Notes asc", which resides in the C:\N-plant subdirectory. The following Pascal code accomplishes this task:

```
FN9:  Begin
         SaveScreen;
         SwapVectors;
         Exec('c:\advisor\B.exe','C:\N-plant\Notes.asc');
         SwapVectors;
         RestoreScreen;
      End;
```

This task may be accomplished by other methods preferred by programmers skilled in the art. Other special function keys may be programmed to implement additional functionalities.

One special function key permits the technician to conduct an index search of the knowledge elements. By pressing this special function key the titles of all knowledge elements contained in the knowledge base will be alphabetically listed and will be displayed on top of the current knowledge element display as shown in FIG. 10. FIG. 10 is a display of only the first page of a comprehensive listing of knowledge element titles. of a comprehensive listing of knowledge element titles. The remaining pages of this list can be accessed by pressing the <PgDn> key one or more times. The technician places the cursor onto the desired title and depresses the <Enter> key to access that specific knowledge element without linkage to the current knowledge element. Pressing the <Esc> key will allow the technician to terminate the index search and immediately return to the same spot in the current knowledge element from which the index search started. A word or "Keyword" search may also be conducted using another dedicated special function key which causes a small framed window to appear on top of the current knowledge element as shown in FIG. 11. In the prior example if the technician elected to open up the knowledge element "bottle up" this could be done at any time simply by depressing the appropriate special function key for the keyword search and selecting the "bottle up" knowledge element. This would display the "bottle up" knowledge element over the current display which can be recovered upon depressing the <Esc> key. In the same fashion the technician through the use of another dedicated special function key may activate a "pattern search" to find a particular sentence containing the indicated word pattern or a specific combination of words. The pattern search is different from the keyword search in that the pattern search produces an upward shifting of all sentences contained in the current knowledge element in such a way that the particular sentence which contains the search words in the framed window designating the words of the pattern search will appear on the very first line within the display of the current knowledge element. The technician through yet another special function key may access any one of a large number of external software programs which are commercially available such as programs to perform specific analyses and programs to display multi-level hierarchical structure of the knowledge base or a program to acquire on-line process data from remote plant sites and to interpret the inputted data and transfer the results to the knowledge base. Yet another special function key can be programmed to allow the technician to update the knowledge base.

What is claimed is:

1. A diagnostic advisory system for troubleshooting an abnormal condition in the production of at least one gas in an air separation plant identified by one or more alarm or shutdown signals triggered by a different fault condition affecting the normal production of said at least one gas with said diagnostic advisory system comprising:

a programmed computer including memory means for storing a knowledge base of an air separation plant composed of a hierarchy of knowledge elements containing textual, graphical and/or video material for providing advice and guidance to an operator to enable the operator to monitor and to determine the cause of a fault condition of at least one gas and what action to take to correct such fault with the knowledge elements arranged in a sequence having an ordered priority corresponding to different levels of information with the highest priority knowledge element for the identified fault condition providing a preset number of diagnostic strategies with each strategy incorporating one or more subordinate knowledge elements in ranked order to the higher knowledge elements and to one another in accordance with the priority given to each level of information;

means for interactively linking subordinate knowledge element(s) to their higher priority knowledge element(s);

means responsive to a fault indicating signal for displaying each of said knowledge elements with each subordinate knowledge element displayed in a cascade formation relative to all higher ranking knowledge elements to which it is linked for said fault indicated signal; and means for successively displaying one or more lower ranking knowledge elements within the linkage chain of knowledge elements to indicate what remedial action should be taken to correct the fault condition; and means for returning to any higher knowledge element from which the displayed lower knowledge element depends.

2. A diagnostic advisory system as defined in claim 1 wherein said means for returning to any higher knowledge element operates to sequentially return the display to each higher knowledge element in the chain of selected knowledge elements.

3. A diagnostic advisory system as defined in claim 2 further comprising means for jumping out of the knowledge base to access external software programs and for returning to the knowledge base exactly at the location in the knowledge base from where the knowledge base was exited.

4. A diagnostic advisory system as defined in claim 1 further comprising means for conducting an index search for providing an alphabetical listing of all knowledge elements in the knowledge base at a location on said display showing the linkage to the knowledge element at the outset of said index search.

5. A diagnostic advisory system as defined in claim 1 further comprising means for conducting a word search which will access all knowledge elements corresponding to the matched words which are not directly linked to the knowledge element under diagnosis.

6. A diagnostic advisory system as defined in claim 1 further comprising means for performing a pattern search for specific word patterns within a given knowledge element.

7. A diagnostic advisory system as defined in claim 1 further comprising means for accessing an external text editing or word processing software program to write notes and comments to an electronic file in connection with the diagnostic procedure relative to a given knowledge element and for returning to the position in the knowledge element under diagnosis at the location when the external file was accessed.

8. A diagnostic method for troubleshooting an abnormal condition of an air separation plant identified by one or more alarm or shutdown signals corresponding to different fault conditions affecting the normal production of at least one gas comprising the steps of:

forming a knowledge base of an air separation plant in which air is decomposed into purified constituents selected from the group of gases comprising nitrogen, oxygen, argon and said knowledge base composed of a hierarchy of knowledge elements for providing advice and guidance to an operator to enable the operator to monitor and to determine the cause of a fault condition in at least one gas and what action to take to correct such fault with each identified fault condition having a set of knowledge elements for providing textual, graphical and/or video material and arranged in a sequence having an ordered priority corresponding to different levels of information with the highest priority knowledge element for the identified fault condition providing a preset number of diagnostic strategies with each strategy incorporating one or more subordinate knowledge elements in ranked order to the higher knowledge elements and to one another in accordance with the priority given to each level of information;

storing in a computer said knowledge base of the air separation plant and along with means for monitoring the production of at least one gas in the air separation plant;

detecting a fault condition in the industrial air separation plant by one or more signals;

actuating the signal in the computer to display the highest priority knowledge element corresponding to the existing fault condition;

displaying the selected highest priority knowledge element on a monitor connected to said computer;

selecting a subordinate knowledge element identified within the selected highest priority knowledge element with said subordinate knowledge element containing a list of action steps to be taken by the user to relate the fault condition to a specific device, component or process known to cause such default and outlining one or more appropriate remedial action steps to correct such device, component or process;

displaying the selected subordinate knowledge element on said monitor in a cascade fashion relative to its higher ranking knowledge element;

highlighting in succession each action step in said subordinate knowledge element to be taken by the user;

linking each highlighted action step in each subordinate knowledge element to other knowledge elements of lower ranking to provide the user with access to additional information and advice relating to each action step; and displaying each linked lower ranking knowledge element in succession and in a cascade fashion partially superimposed over each higher ranking knowledge element to provide further information to the user to facilitate remedial action to correct the fault condition with the operator knowing at all times the position of the knowledge element displayed relative to all linked higher ranking knowledge elements.

9. A diagnostic method as defined in claim 8 wherein each subordinate knowledge element containing action steps includes a brief statement of the overall function of said knowledge element and is linked to a knowledge element displaying a logic decision tree for the subordinate knowledge element containing said action steps.

10. A diagnostic method as defined in claim 9 wherein said brief statement contains reference to at least one other knowledge element providing a definition and/or explanation of the operation of the knowledge element under diagnosis.

* * * * *